United States Patent
Catchpole

(10) Patent No.: US 10,971,140 B2
(45) Date of Patent: Apr. 6, 2021

(54) SPEECH RECOGNITION CIRCUIT USING PARALLEL PROCESSORS

(71) Applicant: Zentian Limited, Cambridge (GB)

(72) Inventor: Mark Catchpole, Prickwillow (GB)

(73) Assignee: Zentian Limited, Cambridge (GB)

( * ) Notice: Subject to any disclaimer, the term of this patent is extended or adjusted under 35 U.S.C. 154(b) by 0 days.

(21) Appl. No.: 16/266,265

(22) Filed: Feb. 4, 2019

(65) Prior Publication Data
US 2019/0172447 A1 Jun. 6, 2019

Related U.S. Application Data

(63) Continuation of application No. 15/392,396, filed on Dec. 28, 2016, now Pat. No. 10,217,460, which is a
(Continued)

(30) Foreign Application Priority Data

Feb. 4, 2002 (GB) ....................................... 0202546

(51) Int. Cl.
*G10L 15/32* (2013.01)
*G10L 15/187* (2013.01)
(Continued)

(52) U.S. Cl.
CPC ............ *G10L 15/187* (2013.01); *G10L 15/05* (2013.01); *G10L 15/34* (2013.01)

(58) Field of Classification Search
CPC .................................. G10L 15/32; G10L 15/34
See application file for complete search history.

(56) References Cited

U.S. PATENT DOCUMENTS 4,977,599 A * 12/1990 Bahl ....................... G10L 15/02
704/256.4
4,980,918 A * 12/1990 Bahl ....................... G10L 15/08
704/240
(Continued)

FOREIGN PATENT DOCUMENTS

GB 2 112 194 A 7/1983
GB 2 331 392 A 5/1999
(Continued)

OTHER PUBLICATIONS

R.M. Woodward et al., "Tissue Classification Using Terahertz Pulsed Imaging", Proceedings of the SPIE—The International Society for Optical Engineering SPIE-INT. Soc. Opt. Eng. USA, vol. 5318, No. 1, 2004, pp. 23-33. Abstract also attached.
(Continued)

*Primary Examiner* — Daniel Abebe
(74) *Attorney, Agent, or Firm* — Finnegan Henderson Farabow Garrett & Dunner LLP

(57) ABSTRACT

A speech recognition circuit comprises an input buffer for receiving processed speech parameters. A lexical memory contains lexical data for word recognition. The lexical data comprises a plurality of lexical tree data structures. Each lexical tree data structure comprises a model of words having common prefix components. An initial component of each lexical tree structure is unique. A plurality of lexical tree processors are connected in parallel to the input buffer for processing the speech parameters in parallel to perform parallel lexical tree processing for word recognition by accessing the lexical data in the lexical memory. A results memory is connected to the lexical tree processors for storing processing results from the lexical tree processors and lexical tree identifiers to identify lexical trees to be processed by the lexical tree processors. A controller controls the lexical tree processors to process lexical trees
(Continued)

identified in the results memory by performing parallel processing on a plurality of said lexical tree data structures.

8 Claims, 6 Drawing Sheets

Related U.S. Application Data continuation of application No. 14/309,476, filed on Jun. 19, 2014, now Pat. No. 9,536,516, which is a continuation of application No. 13/253,223, filed on Oct. 5, 2011, now Pat. No. 8,768,696, which is a continuation of application No. 12/554,607, filed on Sep. 4, 2009, now Pat. No. 8,036,890, which is a continuation of application No. 10/503,463, filed as application No. PCT/GB03/00459 on Feb. 4, 2003, now Pat. No. 7,587,319.

(51) Int. Cl.
*G10L 15/34* (2013.01)
*G10L 15/05* (2013.01)

(56) References Cited

U.S. PATENT DOCUMENTS

| | | | |
|---|---|---|---|
| 5,293,213 A | | 3/1994 | Klein et al. |
| 5,349,645 A | | 9/1994 | Zhao |
| 5,457,768 A | | 10/1995 | Tsuboi |
| 5,579,436 A | * | 11/1996 | Chou .................... G10L 15/063 704/236 |
| 5,621,859 A | | 4/1997 | Schwartz |
| 5,710,866 A | * | 1/1998 | Alleva .................... G10L 15/10 704/246 |
| 5,832,428 A | | 11/1998 | Chow |
| 5,881,312 A | | 3/1999 | Dulong |
| 5,960,395 A | | 9/1999 | Tzirkel-Hanock |
| 5,983,180 A | * | 11/1999 | Robinson .............. G10L 15/142 704/254 |
| 5,995,930 A | | 11/1999 | Hab-Umbach et al. |
| 6,047,283 A | | 4/2000 | Braun |
| 6,374,222 B1 | | 4/2002 | Kao |
| 6,526,380 B1 | | 2/2003 | Thelen |
| 7,024,359 B2 | * | 4/2006 | Chang .................... G10L 15/065 704/251 |
| 7,035,802 B1 | | 4/2006 | Rigazio |
| 7,065,488 B2 | * | 6/2006 | Yajima .................... G10L 15/20 704/226 |
| 7,120,582 B1 | | 10/2006 | Young et al. |
| 7,174,037 B2 | | 2/2007 | Arnone et al. |
| 7,899,669 B2 | | 3/2011 | Gadbois |
| 2001/0011218 A1 | | 8/2001 | Phillips et al. |
| 2002/0143531 A1 | | 10/2002 | Kahn |
| 2003/0178584 A1 | | 9/2003 | Arnone et al. |
| 2005/0119883 A1 | * | 6/2005 | Miyazaki .............. G10L 15/142 704/231 |
| 2008/0255839 A1 | | 10/2008 | Larri et al. |

FOREIGN PATENT DOCUMENTS

| | | |
|---|---|---|
| GB | 2 347 835 A | 9/2000 |
| GB | 2 380 920 A | 4/2003 |
| WO | WO 00/50859 | 8/2000 |
| WO | WO-03/067572 A2 | 8/2003 |

OTHER PUBLICATIONS

V.P. Wallace et al., "Biomedical Applications of THz Imaging", Microwave Symposium Digest, 2004, IEEE MTT-S International Fort Worth, TX, USA, Jun. 6-11, 2004, Piscataway, NJ, USA, IEEE, vol. 3, Jun. 6, 2004 (Jun. 6, 2004), pp. 1579-1581.

V.P. Wallace et al., "Biomedical Applications of Terahertz Pulse Imaging", Second Joint EMBS-BMES Conference 2002. Conference Proceedings. 24th Annual International Conference of the Engineering in Medicinal and Biology Society. Annual Fall Meeting of the Biomedical Engineering Society, Houston, TX, Oct. 23-26, 2002, Annual vol. 1 of 3. Conf. 24, Oct. 23, 2002 (Oct. 23, 2002), pp. 2333-2334.

A.J. Fitzgerald et al., "Terahertz Imaging of Breast Cancer, a Feasibility Study", Conference Digest of the 2004 Joint 29th International Conference on Infrared and Millimeter Waves and 12th International Conference on Terahertz Electronics IEEE Piscataway, NJ, USA, 2004, pp. 823-824.

B.E. Cole et al., "Terahertz Imaging and Spectroscopy of Human Skin, In-vivo", Proceedings of SPIE, vol. 4276, pp. 1-10.

S. Glinski et al., "Spoken Language Recognition on a DSP Array Processor", IEEE Transactions on Parallel and Distributed Systems, Jul. 5, 1994, No. 7, New York, USA, pp. 697-703.

S. Chatterjee et al., "Connected Speech Recognition on a Multiple Processor Pipeline", ICASSP 89, May 23, 1989, Glasgow, UK, pp. 774-777.

S. H. Chung et al. "A Parallel Phoneme Recognition Algorithm Based on Continuous Hidden Markov Model", Proceedings 13th International Parallel Processing Symposium and 10th Symposium on Parallel and Distributed Processing, IPPS/SPDP 1999, Proceedings of 13th International Parallel Processing Symposium and 10th Symposium on Parallel and Distributed Pro, IEEE Comput. Soc. pp. 453-457 (1999).

S.H. Chung et al. "A Parallel Computation Model for Integrated Speech and Natural Language Understanding", IEEE Transactions on Computers, vol. 42, No. 10, Oct. 1, 1993.

N. Deshmukn et al. "Hierarchical Search for Large-Vocabulary Conversational Speech Recognition: Working Toward a Solution to the Decoding Problem", IEEE Signal Processing Magazine, vol. 16, No. 5, pp. 84-107 (Sep. 1999).

* cited by examiner

SPEECH RECOGNITION CIRCUIT USING PARALLEL PROCESSORS

This is a continuation of application Ser. No. 15/392,396, filed Dec. 28, 2016, which is a continuation of application Ser. No. 14/309,476, filed Jun. 19, 2014, now U.S. Pat. No. 9,536,516, which is a continuation of application Ser. No. 13/253,223, now U.S. Pat. No. 8,768,696, filed Oct. 5, 2011, which is a continuation of application Ser. No. 12/554,607, now U.S. Pat. No. 8,036,890, filed Sep. 4, 2009, which is continuation of application Ser. No. 10/503,463, now U.S. Pat. No. 7,587,319, filed May 24, 2005, which is a 371 of International Application No. PCT/GB2003/000459, filed Feb. 4, 2003, which claims foreign priority to United Kingdom Application No. 0202546.8 filed Feb. 4, 2002, the disclosures of which are incorporated herein by reference in their entireties.

The present invention generally relates to a speech recognition circuit which uses parallel processors for processing the input speech data in parallel.

Conventional large vocabulary speech recognition can be divided into two processes: front end processing to generate processed speech parameters such as feature vectors, followed by a search process which attempts to find the most likely set of words spoken from a given vocabulary (lexicon).

The front end processing generally represents no problem for current processing systems. However, for large vocabulary, speaker independent speech recognition, it is the search process that presents the biggest challenge. An article by Deshmukh et al entitled "Hierarchical Search for Large-Vocabulary Conversational Speech Recognition" (IEEE Signal Processing Magazine, September 1999, pages 84 to 107), the content of which is hereby incorporated by reference, discusses the general concepts of large vocabulary speech recognition. As discussed in this paper, one algorithm for performing the search is the Viterbi algorithm. The Viterbi algorithm is a parallel or breadth first search through a transition network of states of Hidden Markov Models. An acoustic model for words in a lexicon are represented as states of Hidden Markov Models. These states represent phones or n phones in a phone model of the words. The search requires the evaluation of possible word matches. It is known that such a search is computationally intensive.

In order to speed up the processing, performed during such a search in a speech recognition system, parallel processing has been explored. In an article by M K Ravishankar entitled "Parallel Implementation of Fast Beam Search for Speaker-Independent Continuous Speech Recognition" (Indian Institute of Science, Bangalor, India, Jul. 16, 1993) a multi-threaded implementation of a fast beam search algorithm is disclosed. The multi-threading implementation requires a significant amount of communication and synchronization among threads. In an MSC project report by R. Dujari entitled "Parallel Viterbi Search Algorithm for Speech Recognition" (MIT, February 1992) the parallel processing of input speech parameters is disclosed in which a lexical network is split statically among processors.

It is an object of the present invention to provide an improved circuit which can perform parallel processing of speech parameters.

In accordance with a first embodiment of the present invention, a speech recognition circuit comprises an input port such as input buffer for receiving parameterized speech data such as feature vectors. A lexical memory arrangement is provided which contains lexicon data for word recognition. The lexical data comprises a plurality of lexical tree data structures representing a plurality of lexical trees. Each lexical tree data structure comprises a model of words having common prefix components and an initial component which is unique as an initial component for lexical trees. A plurality of lexical tree processors are connected in parallel to the input port and perform parallel lexical tree processing for word recognition by accessing the lexical data in the lexical memory arrangement. A results memory arrangement is connected to the lexical tree processors for storing processing results from the lexical tree processors and lexical tree identifiers to identify lexical trees to be processed by the lexical tree processors. A controller controls the lexical tree processors to process lexical trees identified in the results memory arrangement by performing parallel processing of a plurality of lexical tree data structures.

Thus in accordance with this embodiment of the present invention, the processing in order to perform word recognition is distributed across the processors by controlling the processors to perform processing on different lexical trees. The controller controls the processor by the processes to provide for efficient process management by distributing lexical processing to appropriate processors.

The lexical tree data structure can comprise a phone model of words, wherein the components comprise phones. For reduced storage, the lexical tree data structure can comprise a mono phone lexical tree. The mono phone lexical tree can be used to generate context dependent phone models dynamically. This enables the use of context dependent phone models for matching and hence increased accuracy whilst not increasing memory requirements. Alternatively, the lexical tree data structure can comprise context dependent phone models.

The processing performed by each processor in one embodiment comprises the comparison of the speech parameters with the lexical data, e.g. phone models or data derived from the lexical data (e.g. dynamically generated context dependent phone models) to identify words as a word recognition event and to send information identifying the identified words to the results memory as the processing results. In this embodiment a language model processor arrangement can be provided for providing a language model output for modifying the processing results at a word recognition event by a lexical tree processor. The modification can either take place at each lexical tree processor, or at the language model processing arrangement.

In one embodiment each lexical tree processor determines an output score for words in the processing results at word recognition events. Thus in this embodiment the language model processing arrangement can modify the score using a score for a language model for n preceding words, where n is an integer.

In one embodiment the controller instructs a lexical tree processor to process a lexical tree by passing a lexical tree identifier for the lexical tree and history data for a recognition path associated with the lexical tree from the results memory. The history data preferably includes an accumulated score for the recognition path. This enables a score to be determined based on the score for the recognition path to accumulate a new score during recognition carried out using the lexical tree data structure. The scores can be output in the processing results to the results memory during the processing of the speech parameters so that the scores can be used for pruning.

In one embodiment of the present invention, each lexical tree processor operates on more than one lexical tree at the same time, e.g. two lexical trees represented by two different lexical tree data structures, or two lexical trees represented by the same data structure but displaced in time (which can be termed to instances of the same lexical tree).

At word recognition events, the controller determines new lexical tree identifiers for storing in the results memory for words identified in the results memory for respective word events. In order to reduce the processing, the controller can prune the new lexical tree identifiers to reduce the number of lexical trees which are required to be processed. This pruning can be achieved using context dependant n phones to reduce the number of possible next phones. The number can be further reduced by using a language model look ahead technique.

In one embodiment of the present invention, the lexical tree processors are arranged in groups or clusters. The lexical memory arrangement comprises a plurality of partial lexical memories. Each partial lexical memory is connected to one of the groups of lexical tree processors and contains part of the lexical data. Thus a group of lexical tree processors and a partial lexical memory form a cluster. Each lexical tree processor is operative to process the speech parameters using a partial lexical memory and the controller controls each lexical tree processor to process a lexical tree corresponding to partial lexical data in a corresponding partial lexical memory.

In another embodiment of the present invention the lexical memory arrangement comprises a plurality of partial lexical memories. Each partial lexical memory being connected to one of the lexical tree processors and containing part of the lexical data. Each lexical tree processor processes the speech parameters using a corresponding partial lexical memory and the controller is operative to control each lexical tree processor to process a lexical tree corresponding to partial lexical data in a corresponding partial lexical memory.

In one embodiment of the present invention the lexical memory arrangement stores the lexical tree data structures as Hidden Markov Models and the lexical tree processors are operative to perform the Viterbi search algorithm using each respective lexical tree data structure. Thus in this way, this embodiment of the present invention provides a parallel Viterbi lexical tree search process for speech recognition.

The first aspect of the present invention is a special purpose circuit built for performing the speech recognition search process in which there are a plurality of processors for performing parallel lexical tree processing on individual lexical tree processors.

In another aspect of the present invention a speech recognition circuit comprises an input port such as an input buffer for receiving parameterized speech data such as feature vectors. A plurality of lexical memories are provided which contain in combination complete lexical data for word recognition. Each lexical memory contains part of the complete lexical data. A plurality of processors are provided connected in parallel to the input port for processing the speech parameters in parallel. The processors are arranged in groups in which each group is connected to a corresponding lexical memory to form a cluster. A controller controls each processor to process the speech parameters using partial lexical data read from a corresponding lexical memory. The results of processing the speech parameters are output from the processors as recognition data.

Thus this aspect of the present invention provides a circuit in which speech recognition processing is performed in parallel by groups of processors operating in parallel in which each group accesses a common memory of lexical data. This aspect of the present invention provides the advantage of parallel processing of speech parameters and benefits from a limited segmentation of the lexical data. By providing a plurality of processors in a group with a common memory, flexibility in the processing is provided without being bandwidth limited by the interface to the memory that would occur if only a single memory were used for all processors. The arrangement is more flexible than the parallel processing arrangement in which each processor only has access to its own local memory and requires fewer memory interfaces (i.e. chip pins). Each processor within a group can access the same lexical data as any other processor in the group. The controller can thus control the parallel processing of input speech parameters in a more flexible manner. For example, it allows more than one processor to process input speech parameters using the same lexical data in a lexical memory. This is because the lexical data is segmented into domains which are accessible by multiple processors.

In a preferred embodiment this aspect of the present invention is used in combination with the first aspect of the present invention. In such an arrangement each processor performs lexical tree processing and the lexical data stored in each lexical memory comprises lexical tree data structures which each comprise a model of words having common prefix components and an initial component that is unique.

In preferred embodiments of the second aspect of the present invention, the preferred embodiments of the first aspect of the present invention are incorporated.

Embodiments of the present invention will now be described with reference to the accompanying drawings in which:

FIG. 1 illustrates a typical circuit for the parameterization of input speech data. In this embodiment the parameters generated are speech vectors.

Figure 1:
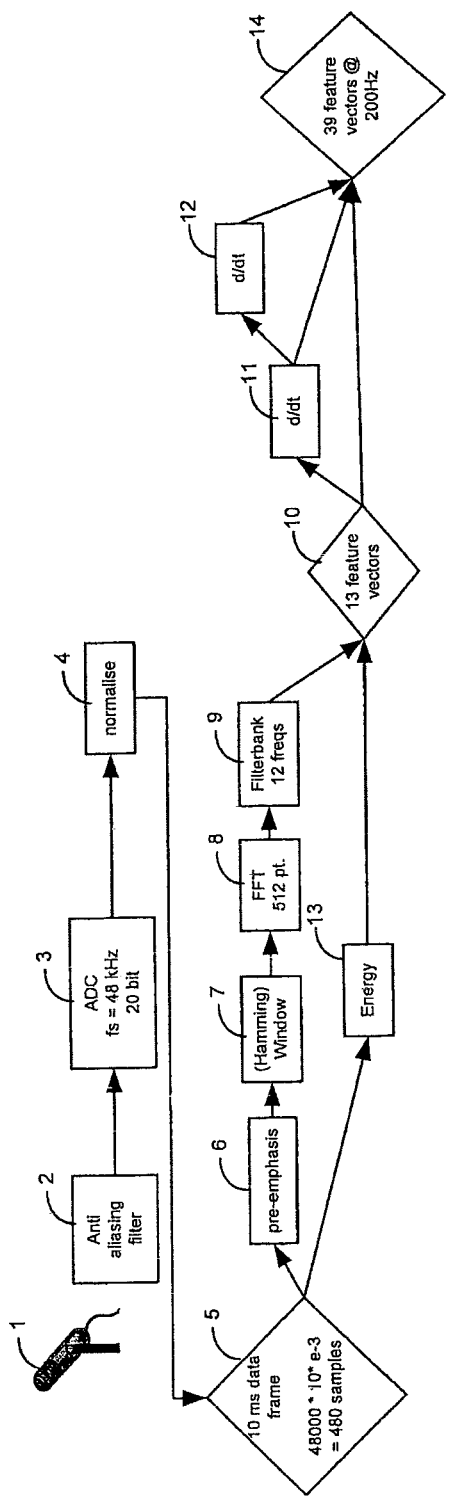
FIG. 1 is a diagram of a speech data processing circuit for generating parameterized speech data (feature vectors)

A microphone 1 records speech in an analogue form and this is input through an anti-aliasing filter 2 to an analogue-to-digital converter 3 which samples the speech at 48 kHz at 20 bits per sample. The digitized output signal is normalized (4) to generated a 10 millisecond data frame every 5 milliseconds with 5 milliseconds overlap (5). A pre-emphasis operation 6 is applied to the data followed by a hamming window 7. The data is then fast Fourier transformed (FFT) using a 512 point fast Fourier transform (8) before being filtered by filter bank 9 into 12 frequencies. The energy in the data frame 5 is also recorded (13) as an additional feature and together with the 12 frequency outputs of the filter bank 9, 13 feature vectors (10) are thus produced and these are output as part of the 39 feature vectors 14. First and second derivatives (11 and 12) are taken of the 13 feature vectors 10 to complete the generation of the 39 feature vectors 14.

The arrangement illustrated in FIG. 1 is purely given for illustration. The present invention encompasses any means by which speech and data can be parameterized to a suitable form for input to the search process as will be described in more detail hereinafter.

Figure 2:
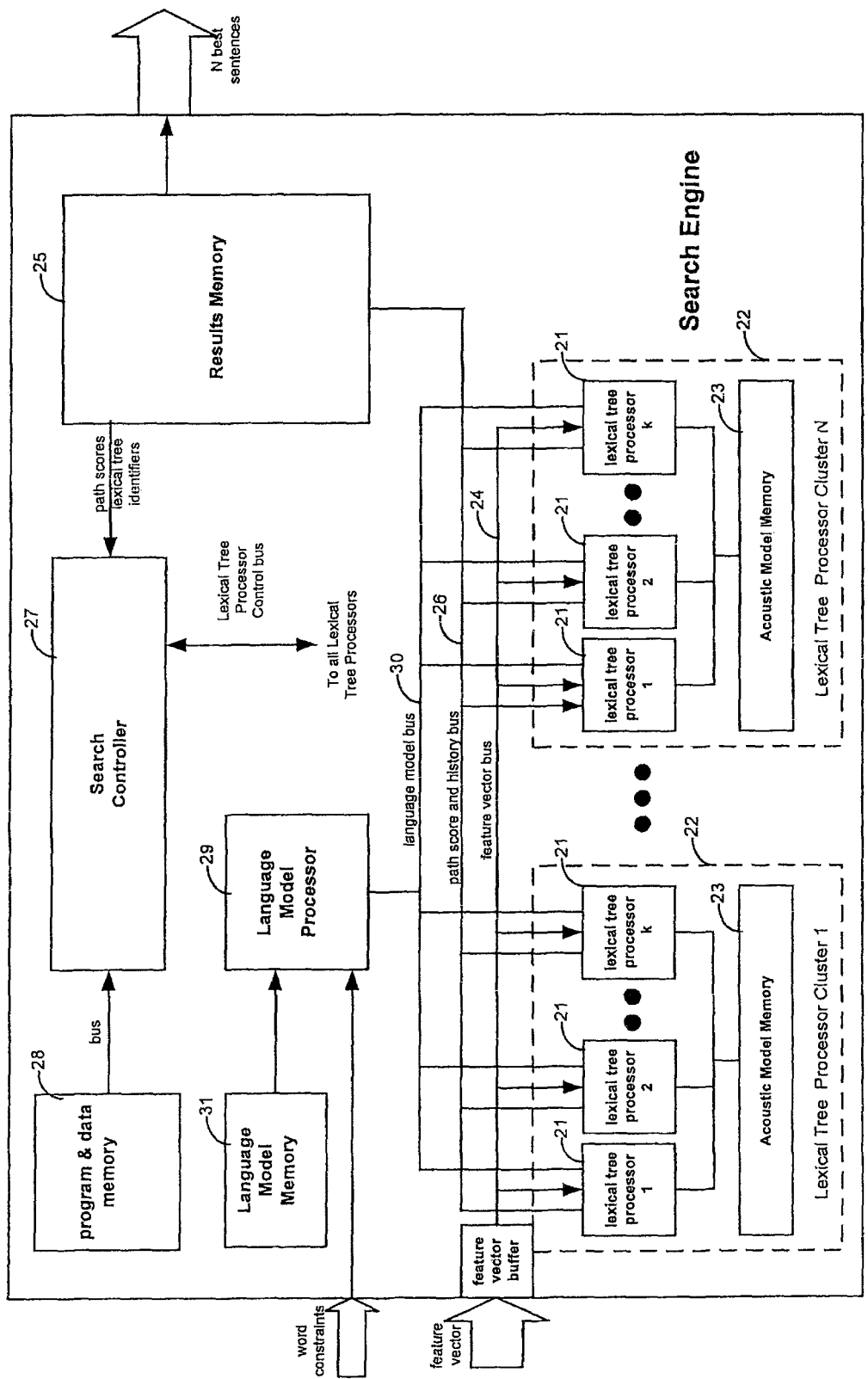
FIG. 2 is a diagram of a speech recognition circuit in accordance with an embodiment of the present invention.

FIG. 2 is a schematic diagram of a speech recognition circuit in accordance with an embodiment of the present invention for performing the search process. The parameterized speech data, which in this embodiment comprise feature vectors, are input to a feature vector buffer 20. The feature vector buffer 20 is provided to buffer the incoming feature vectors to allow lexical tree processors 21 to read and process the feature vectors in the buffer 20 via a feature vector bus 24. A plurality k of lexical tree processors 21 are arranged in a respective lexical tree processor cluster 22. Each lexical tree processor cluster 22 has an acoustic model memory 23 in which is stored lexical data for use by the lexical tree processors 21 within the lexical tree processor cluster 22. Each lexical tree processor 21 in the lexical tree processor cluster 22 is connected to the acoustic model memory 23 within the lexical tree processor 22. There are N lexical tree processor clusters and thus there are Nk lexical tree processors 21 connected by the feature vector bus 24 to the feature vector buffer 20. Each lexical tree processor 21 is capable of processing a different lexical tree and thus Nk lexical trees can be processed in parallel. The acoustic model memories 23 store as a whole a complete set of lexical data, i.e. lexical tree data structures for use in the lexical tree processing by the lexical tree processors 21. Each acoustic model memory 23 contains part or a segment of the lexical tree data. Since lexical tree processors 21 in a lexical tree processor cluster 22 access the same acoustic model memory 23, it is possible for more than one lexical tree processor 21 to process the same lexical data. This provides for some degree of flexibility in the controlling of the processing by the lexical tree processors 21. Further, the acoustic model memories 23 need not contain only one copy of the lexical data. It is-possible to build in a redundancy in the data to further enhance the flexibility. This avoids any bottleneck in the processing due to the search processing focusing on a small number of lexical trees.

A results memory 25 is provided for storing processing results from the lexical tree processors 21 which are received over the path score and history bus 26. The results memory 25 also stores information on lexical trees to identify which lexical trees are to be processed. A search controller 27 is provided to control the processing performed by the lexical tree processors 21 in dependence upon a program and data stored in program and data memory 28. The search controller reads the path scores and lexical tree identifiers from the results memory and controls the lexical tree processors accordingly. A language model processor 29 is provided which is connected to each lexical tree processor 21 by a language model bus 30. The language model processor 29 accesses a language model memory 31 to read language model data for provision to lexical tree processors 21 in response to language model data requests. External control of the language model memory 31 is provided by a word constrains input. The language model processor 29 determines a score for a word occurring following N previous words using N grams. When a lexical tree processor requires a language model score a request is sent to the language model processor 29 over the language model bus 30 identifying the current word and the N−1 previous words. A language model score for the N gram can be returned to the lexical tree processor 21 for the modification of the score at the end of a branch of lexical tree processing. The lexical tree processor can modify the score in accordance with the language model and output a score to the results memory 25 for a word at the end of a branch of the lexical tree processing. Thus the results memory stores the results as an ordered list of scores for words together with their histories.

The results memory 25 stores the following data:

1. Initial lexical tree data. This comprises pointers to an initial set of lexical trees. No history data is associated with the initial set of lexical trees. The initial set of lexical trees is predetermined and stored in the results memory 25 based on the most likely initial phones of as utterance. This initial lexical tree data is required to initialize the search process.

2. History data for search results. This comprises a record of a recognition path through the lexical tree recognition process performed by the lexical tree processors 21. The history data includes the current word, the previous N−1 words, the current accumulated score, the phone history (for use in the determination of likely next lexical trees using cross word context dependent tri-phones), and an identifier or pointer to the lexical tree used for identifying the word.

3. Best scores for best paths being processed by each lexical tree processor 21. This information enables the search controller 27 to monitor the processing being performed by lexical tree processors 21 to determine whether a global pruning strategy should be applied in order to reassign processing performed by a lexical tree processor if its best score for its best path is below a threshold or well below the best scores for the paths being processed by other lexical tree processors 21.

4. Temporary lexical tree scores. These comprise tree scores which are determined as temporary scores to prune the next lexical trees to be processed at word ends. The temporary lexical tree scores include lexical tree identifiers or pointers to identify the next lexical trees to be processed. The scores enable the pruning of this list.

5. Pruning threshold. This can be a global threshold value for use in the pruning of the lexical trees globally, or a local threshold value for use by a lexical processor for locally pruning the processing performed by the lexical processor 21.

The acoustic model memory 23 stores a Hidden Markov Model for acoustically modelling words as lexical trees. The acoustic model memory 23 stores a plurality of lexical tree data structures. Each lexical tree data structure comprises an n phone model of a number of words having common prefix phones. The first node of the lexical tree (the root) comprises a common n phone to all words in the lexical tree and uniquely identifies the lexical tree.

Each lexical tree processor 21 includes on-board memory (or local memory) to be used during the lexical tree processing. This working memory has to store all of the parameters currently working on including current scores for all paths being processed within the lexical tree, and previous N−1 words for the lexical tree. The local storage of the previous N−1 words enables the lexical tree processor 21, when a word end is reached along a branch of the lexical tree, to send a request for the language model score for an N gram by sending the identity of the N−1 previous words together with the word identified at the end of the branch.

Figure 3:
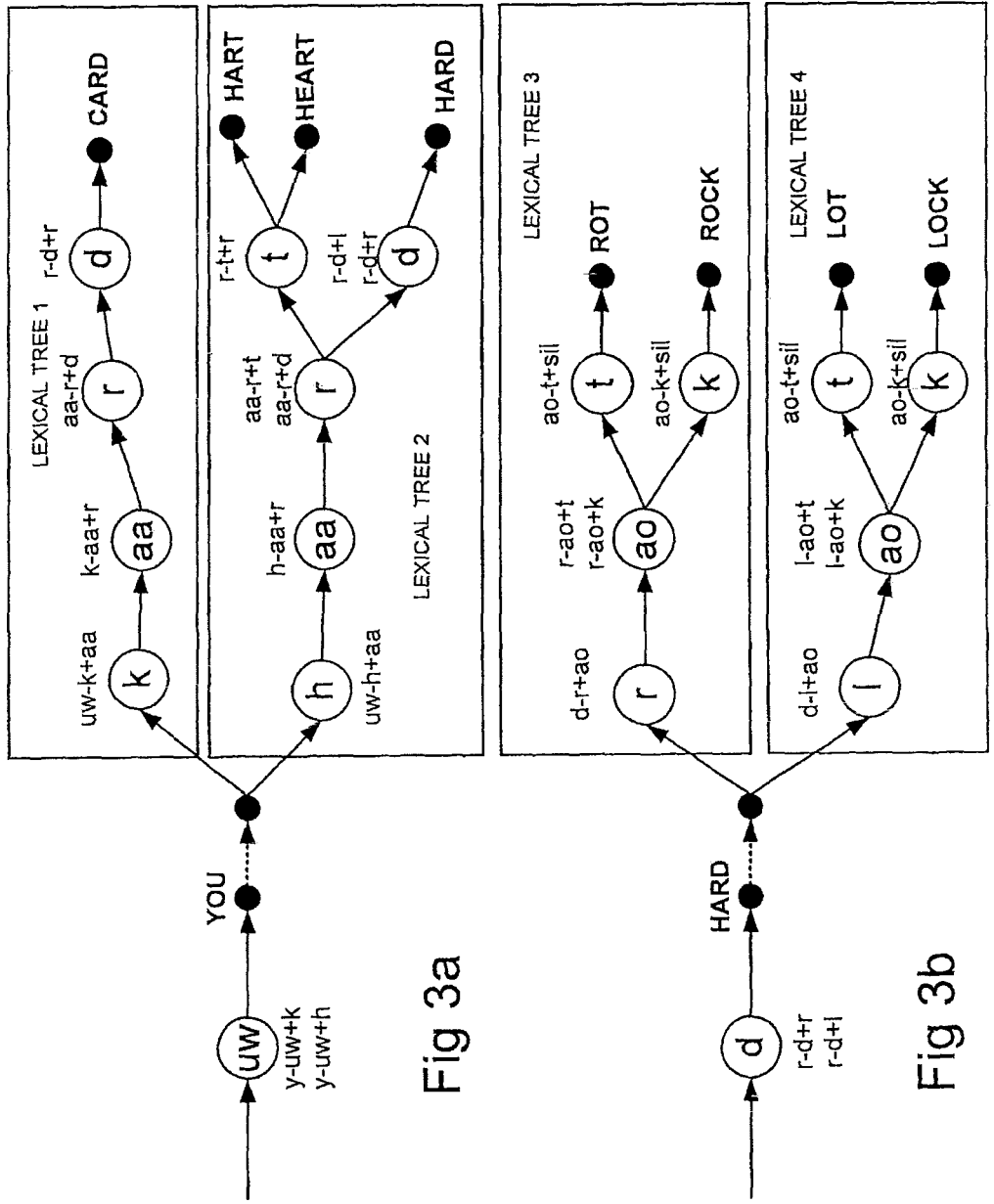
FIGS. 3a and 3b are schematic diagrams illustrating lexical tree structures.

FIGS. 3*a* and 3*b* schematically illustrate lexical trees which can be processed by the lexical tree processor 21 during the recognition of the two words HARD ROCK. In FIG. 3*a* a previous lexical tree terminated at a branch recognizing the word YOU and terminating with the mono phone uw which is associated with two context dependent tri-phones y−uw+k and y−uw+h. Thus the context dependent tri-phone associated with the last phone in the lexical tree word model for YOU indicates two possible next lexical trees, i.e. the lexical trees beginning with the mono phone k and h and having a left context phone of uw. As can be see in FIG. 3a this word end YOU therefore leads to two possible next lexical trees. These two lexical trees are traversed in parallel by two different lexical tree processors accumulating scores for matching of input feature vectors into Hidden Markov Models of the context dependent tri-phones associated with each node in the tree. When the end of the branch is reached, a word end event is reached and a word is recognized. As can be seen in FIG. 3a, in this example since four words are of similar phone length, it is possible for the search strategy based on inputting feature vectors in parallel to simultaneously reach a number of possible word ends. These possible word ends are sent as processing results to the results memory. The results memory stores the accumulated score at the word end together with phone history to identify the last phone and its associated context dependent tri-phones. In this example, considering the branch where the word HARD is recognized, the last phone is d which has associated with it two context dependent tri-phones r–d+l and r–d+r. Thus the search controller 27 can identify next possible lexical trees using the next phone in the context dependent tri-phone. In this case, as can be seen in FIG. 3b, the next possible lexical trees begin with the phones r and l and have associated with them context dependent tri-phones d–r+ao and d–l+ao respectively. Thus these are the next lexical trees that require processing following the end node or word event detected in the processing lexical tree 2. FIG. 3b thus represents the processing that is required at the end of FIG. 3a at the word node for HARD in processing the second lexical tree.

As can be seen in FIG. 3b, the two lexical trees are processed in parallel by traversing through the branches to reach word ends by sequentially entering in feature vectors in parallel to lexical tree processors processing the respective lexical trees. When the word end is reached, the accumulated score is output to the results memory as described before. In this case since it is the last word, the important context dependent tri-phone associated with the final phone has silence (sil) as the following phone. The final phone can in fact have 50 context dependent tri-phones associated with it if there are 50 possible next phones (including silence). FIG. 3b only illustrates the relevant one for the end of the utterance.

Figure 4:
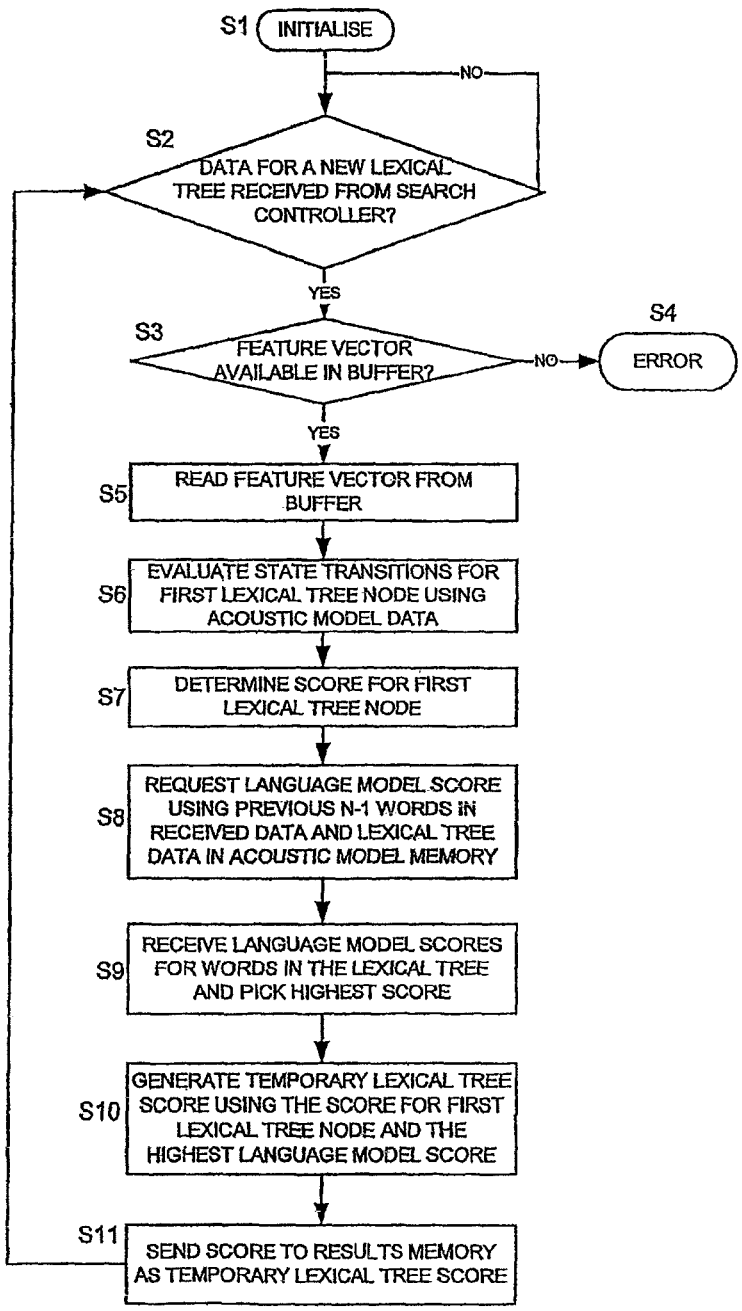
FIG. 4 is a flow diagram illustrating the process performed by a lexical tree processor to determine a temporary lexical tree score in accordance with an embodiment of the present invention.

FIG. 4 is a flow diagram illustrating the processing performed by a lexical tree processor 21 in order to determine a temporary lexical tree score for a lexical tree. When a word end is identified by a lexical tree processor, the processing results are sent to the results memory 25. The results memory identifies the last phone of the recognized words and thus enables the search controller 27 to identify possible next lexical trees using context dependent tri-phones as illustrated in FIG. 3b. Although in theory if there are 50 phones there are $50^2$ possible lexical trees, due to the use of the context dependant triphones, only 100-200 lexical tees are likely to be identified as possible lexical trees. The search controller needs to further prune out the lexical trees which are unlikely to generate likely paths with high scores, hi order to do this, instructions are sent to the lexical tree processors to determine a temporary lexical tree score which can be used to prune out lexical trees from the processing which have a low score.

The processing by the lexical tree processor to generate the temporary lexical tree score is shown in FIG. 4 and for this process, following initialization, a lexical free processor 21 awaits receipt of data for a new lexical free from the search controller 27 (step S2). The data comprises a lexical tree pointer on an identifier to lexical tree data stored in the acoustic model memory 23, i.e. the lexical tree data structure, previous N–1 words (for use in language model score determination by the language model processor 29), and the current path score. The previous N–1 words include the previously recognized word for which a score has been accumulated.

The lexical tree processor 21 then attempts to read the next feature vector from the feature vector buffer 20 (step S3) and if this is not available, an error occurs (step S4). If the feature vector is available in the feature vector buffer 20, the lexical tree processor 21 reads the feature vector from the buffer 20 (step S5) and evaluates the state transitions for the first lexical tree node using the acoustic model data in the acoustic model memory 23 (step S6). Since the state transitions for the first node will require several feature vectors to complete, a score is determined for a state transition of the first node in the lexical tree (step S7). The lexical tree processor 21 then sends a request to the language model processor 29 for a language model score. The request includes the previous N–1 words and all of the possible words represented by the lexical tree data structure in the acoustic model memory 23 (step S8). The language model processor returns scores for each of the N grams ending in the words represented by the lexical tree. The lexical tree processor thus receives language model scores for the words in the lexical tree and picks the highest score (step S9). Alternatively, the language model processor 29 can select the highest n gram score and return this to the lexical tree processor for the determination of the temporary lexical tree score. The temporary lexical tree score for the lexical tree is then generated using the score determined for the first state transition of the first lexical tree node and the highest language model score (step S10). The temporary lexical tree score is then sent by the lexical tree processor 21 to the results memory 25 over the bus 26 (step S11). In this mode of processing, the processor then awaits the next data of the new lexical tree from the search controller (step S2).

This process is just one of the processes performed by the lexical tree processor. The main processing performed by the lexical tree processor is the lexical tree evaluation. This process will now be described with reference to the flow diagram of FIG. 5.

After the start of the process (step S20) a lexical tree processor awaits receipt of data for a lexical tree from the search controller (step S21). The data comprises a lexical tree pointer to a lexical tree data structure stored in the acoustic model memory 23, the previous N–1 words in the recognition path, and the current accumulated score.

The lexical tree processor then attempts to read the next feature vector from the feature vector buffer 20 (step S22). If this is not available, an error occurs (step s23). If the feature vector is available in the feature vector buffer 20, the feature vector is read from the feature vector buffer 20 by the lexical tree processor 21 (step S24) and the lexical tree processor 21 evaluates the state transitions for each path using the acoustic model data in the acoustic model memory 23 (step S25). Scores for the paths are determined in accordance with the conventional Viterbi search technique and the best score for the best path is sent to the results memory 25 while the path histories are stored locally in the on-board memory of the lexical tree processor 21 (step S26). Pruning is applied to the lexical tree by the lexical tree processor to delete paths in order to keep the breadth of the search manageable (step S27). The pruning applied locally by the lexical tree processor can be purely on the basis of a local threshold, which can be provided by the search controller 27, or it can be determined on a relative-basis dependent upon the range of scores for paths being processed within the lexical tree processor 21. If the path has not reached a word end (step S28) the lexical tree processor 21 attempts to read the next feature vector from the feature vector buffer 20 (step S22). If the path reaches a word end (step S28) the score must be modified by the language model score (step S29). There are two ways in which this can be done, in this embodiment the lexical tree processor 21 sends a request to the language model processor 29 for a language model score. The request includes the current word and the N−1 previous words. The language model processor thus returns the language model score and the language model score is used to modify the current accumulated score at the word end. Alternatively, the lexical tree processor can send the language model processor 29 not just the current word and the N−1 previous words, but also the current accumulated score. The language model processor then determines the language model score using the language model memory 31 and modifies the accumulated score using the language model score. The language model processor 29 can then return the modified score to the lexical tree processor 21 which can then pass it to the results memory 25, or a connection between the language model processor 29 and the results memory 25 (not shown) can enable the language model processor 29 to send the score directly to the results memory 25 for the lexical tree processor 21. In this latter case, the language model processor 29 must also receive a lexical tree pointer to identify the lexical tree for which the score applies.

Assuming in this embodiment that the lexical tree processor calculates the modified score (step S29), the score and history is then sent by the lexical tree processor 21 to the results memory 25 (step S30). The history data sent to the results memory 25 comprises the lexical tree pointer identifying the lexical tree, the modified score at the word end, the phone history identifying at least the last phone to allow for context dependent tri-phone determination of next lexical trees, and the identity of the word identified in the evaluation process.

The lexical tree processor then deletes the path and history data in its on-board memory (step S31) and determines if there are any paths still left to be processed (step S32). If so, the lexical tree processor 21 tries to access the next feature vector available in the feature vector buffer 20 (step S22). If there are no paths left to be processed, a message is sent by the lexical tree processor to the search controller 27 to indicate that the lexical tree has been processed (step S33). In this level of processing the lexical tree processor will then await the next data for a lexical tree from the search controller 27.

Figure 5:
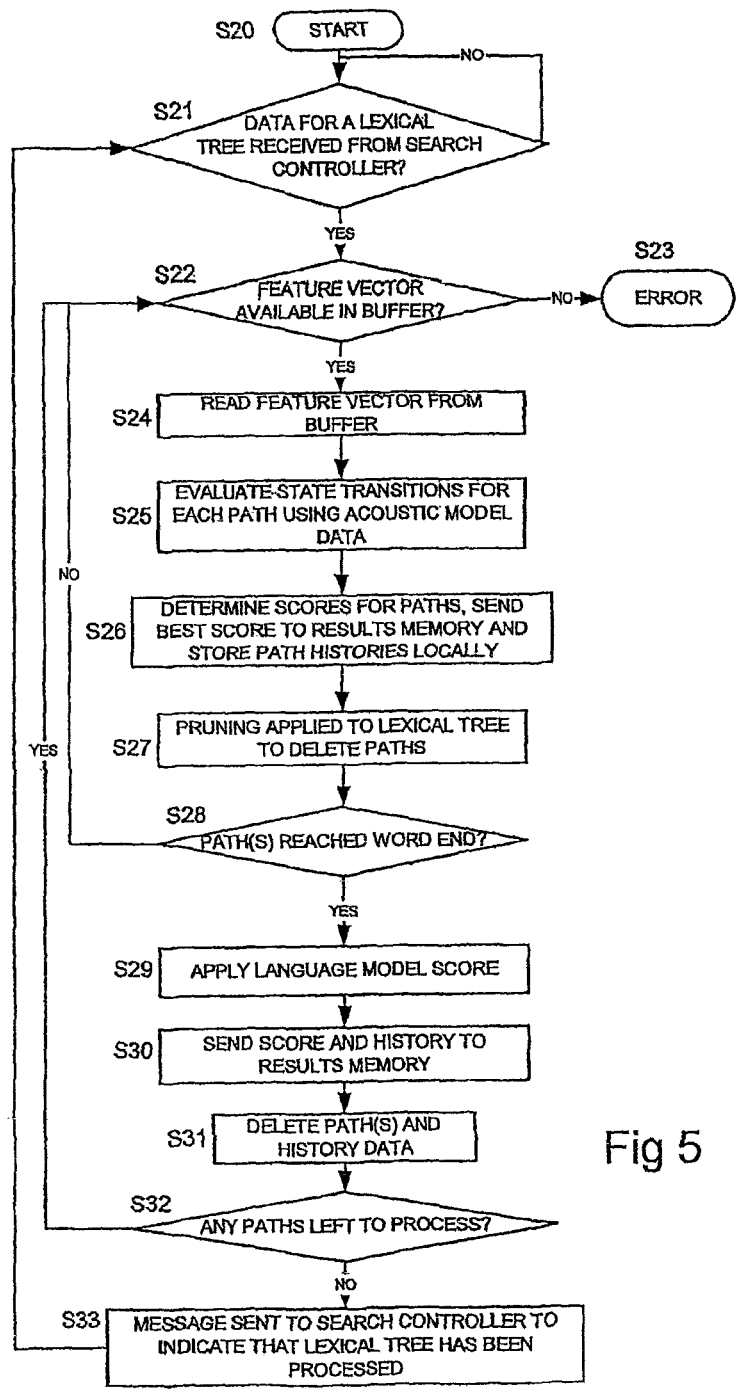
FIG. 5 is a flow diagram illustrating the process performed by the lexical tree processor for processing the input feature vectors in accordance with an embodiment of the present invention.

The flow diagram of FIG. 5 illustrates the processing of a single instance of a lexical tree. The single point in time a lexical tree can start to be processed from a feature vector, i.e. lexical tree processing starts at a time frame. However, due to a word end returned from lexical tree processing in another lexical tree processor, the lexical tree processor may also be asked during a subsequent time frame to start processing another instance of the lexical tree with a different path history. Thus a lexical tree processor 21 can be processing multiple instances of the lexical tree with different paths having different path histories. In this instance, the pruning applied in step S27 needs to take into account all paths currently being processed in all instances of lexical tree processing by the lexical tree processor 21. Thus although pruning is applied locally, it is applied over more than one instance of the lexical tree.

Figure 6:
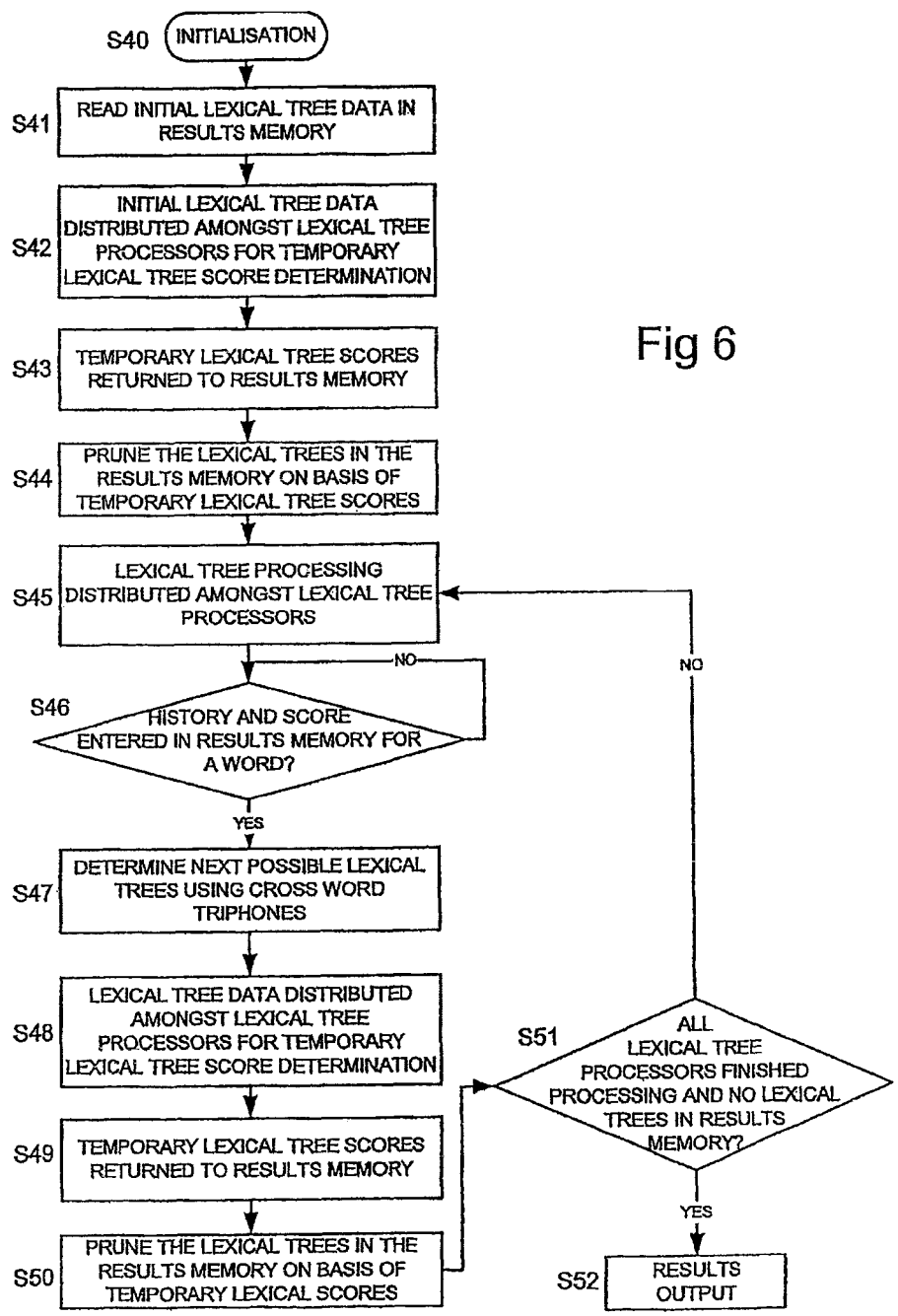
FIG. 6 is a flow diagram illustrating the process performed by the controller in accordance with an embodiment of the present invention.

The operation of the search controller 27 will now be described with reference to the flow diagram of FIG. 6.

After initialization (step S40) initial lexical tree data in the results memory 25 is read (step S41). The search controller distributes the initial lexical tree data amongst the lexical tree processors for temporary lexical tree score determination (step S42) as described with reference to FIG. 4. Temporary lexical tree scores are returned by the lexical tree processors 21 to the results memory 25 (step S43) and the search controller reads the temporary lexical tree scores in the results memory 25 and prunes the lexical trees in the results memory 25 on the basis of the read temporary lexical scores (step S44). Thus the set of initial lexical trees can be quite large and this requires a large number of temporary lexical tree score determinations to be performed by the lexical tree processors 21. However, since the lexical tree processors only need to determine a score for a single feature vector, this can be performed quite quickly. Thus the number of lexical trees for which full evaluation by the lexical tree processors 21 is required can thus be reduced by the selection of the lexical trees with the highest temporary lexical tree score. The search controller than distributes the lexical tree processing among the lexical tree processors 21 by sending each lexical tree processor data including a lexical tree pointer to a lexical tree data structure in the acoustic model memory 23 in the cluster 22. The search controller 27 then awaits the entry of processing results, i.e. history and scores in the results memory 25 for words (step S46). When history and scores for words are entered in the results memory, the search controller 27 determines next possible lexical trees using cross-word tri-phones (step S47). For example, as illustrated in FIGS. 3a and 3b, when the word HARD is entered in the results memory, the search controller identifies the final phone of the word as being d and thus next possible tri-phones can comprise any tri-phones having the left phone d. If there are 50 possible phones, this results in $50^2$ possible tri-phones. In practice, only 1 to 200 are likely. However, this may still represent too many for full evaluation and thus the lexical free data for the next possible lexical trees are distributed amongst the lexical tree processors for temporary lexical tree score determination (step S48). Temporary lexical tree scores are returned to the results memory 25 by the lexical tree processors 21 which execute the process as described with reference to FIG. 4 (step S49).

The search controller 27 prunes the list of next lexical trees in the results memory 25 on the basis of the temporary lexical scores (step S50). The search controller then determines if the words in the results memory have been processed and there are no lexical trees left to be processed and whether or not lexical tree processes are finished (step S51). If not, the lexical tree processing is distributed amongst the lexical tree processors (step S45). When the end of the utterance is reached, next possible lexical trees will all have been processed and the results can be output from the results memory 25 (step S52).

It can be seen from the foregoing description that the embodiment of the invention provides for an efficient parallel processing system incorporating a parallel lexical tree processing architecture and a segmented lexicon storage architecture. Each lexical tree processor performs lexical tree evaluation and language model look ahead for evaluation of company scores for lexical trees to assist in pruning of the number of potential lexical trees that require processing. The architecture is ideally suited to synchronous breadth first searching e.g. a Viterbi search (i.e. real time recognition). The breadth first search is performed synchronously by the parallel processors on the input search parameters when the language model look ahead takes place, it is possible for the feature vector buffer 20 to store a small number, e.g. one or two, feature vectors whilst the language model look ahead is performed on the feature vector so that synchronous breadth first searching can be carried out by re-reading the feature vector out of the buffer 20 when it is determined which lexical trees are to be evaluated by the lexical trees processors 21 after a word end. Thus, the feature vector buffer 20 provides a method of decoupling the search parameterisation circuitry from the search circuit.

If the buffer causes processing to get too far behind, e.g. there are a lot of word end language model look ahead operations to be performed, it is possible for the lexical tree processors to be controlled to temporarily halve their local beamwidths (i.e. more vigorously prune) and thus complete their processing more quickly. This would allow the content of the buffer to be decreased as the processors catch up.

Although the present invention has been described hereinabove with reference to a specific embodiment, it will be apparent to a skilled person in the art that modifications lie within the spirit and scope of the present invention. Although in the embodiment described hereinabove, the acoustic model memories 23 were described as storing parts of the lexical data, it is also possible for more than one copy of the lexical data to be stored in different acoustic model memories 23. Thus, more than one lexical tree processor cluster 22 can have access to the same lexical data. This increases the flexibility and allows the controller to avoid any bottlenecks in processing which, for example, can occur if the highest pass scores all require processing by one or a number of lexical tree data structures residing in one of the acoustic model memories 23.

Although in the embodiments described hereinabove, the memory is partitioned in to a plurality of acoustic model memories 23, the present invention is not limited to the partitioning of the lexical data and a plurality of lexical tree processors can access a single memory containing lexical data.

The lexical data stored can comprise mono phone models of words. When the lexical data is partitioned, these can be distributed evenly across the memories. If there are 50 mono phones, there will be 50 lexical tree data structures having a unique initial model phone data node. Alternatively, the lexical tree data structures can comprise a context dependent n phone word models. If there are 50 mono phones, there are potentially $50^n$ lexical tree data structures. For tri-phones, this comprises $50^3$ (i.e. 125,000). These are distributed so that trees with the same left context tri-phone, are eventually spread across memories when the lexical data is partitioned. Thus in this way the word end where the left context tri-phone is fixed i.e. the same, the next possible lexical trees will inherently be distributed across the memories, thus ensuring efficient parallel processing of the next lexical trees.

Although the embodiment described hereinabove uses a single results memory accessible by all processors, the present invention encompasses a plurality of results memories. For example, a results memory can be associated with each processor to store the processing results and the controller can read the results in the plurality of results memories in order to control the processors.

Although in the embodiment described above the input speech parameters are described as being feature vectors, the present invention encompasses any type of parameterization of speech data as an input to the circuit. Such parameterization methods are well known in the art.

Although in the embodiment described above there is only one language model processor, more than one can be used and these can be used to operate in parallel for processing scores at word boundaries.

What is claimed is:

1. A speech recognition circuit comprising:
   one or more clusters of processors, each of the one or more clusters of processors comprising:
   a plurality of processors; and
   an acoustic model memory storing acoustic model data, wherein each of the plurality of processors is configured to compute a probability using the acoustic model data in the acoustic model memory, wherein:
   the speech recognition circuit is configured to generate an initial score for an audio sample; and
   the initial score is used to determine whether to continue processing to determine a final score via processing a larger amount of model data than that was processed to generate the initial score.

2. The speech recognition circuit of claim 1, wherein the probability is an input to an evaluation of a state transition of a model of states.

3. The speech recognition circuit of claim 2, wherein the model is a Hidden Markov Model.

4. The speech recognition circuit of claim 2, wherein the probability is computed from a Gaussian mixture model and one or more feature vectors.

5. The speech recognition circuit of claim 1, further comprising:
   a buffer for storing one or more feature vectors coupled to at least one of the plurality of processors of the one or more clusters of processors.

6. The speech recognition circuit of claim 5, further comprising:
   a search controller coupled to the at least one of the plurality of processors of the one or more clusters of processors, the search controller capable of controlling the at least one of the plurality of processors of the one or more clusters of processors to initiate speech recognition processing in at least a subset of processors of the one or more clusters of processors.

7. The speech recognition circuit of claim 1, wherein:
   the one or more clusters of processors comprises a first cluster of processors and a second cluster of processors;
   the first cluster comprises a first acoustic model memory; and
   the second cluster comprises a second acoustic model memory that is distinct and separate from the first acoustic model memory.

8. The speech recognition circuit of claim 1, wherein:
   the one or more clusters of processors comprises a first cluster of processors; and
   the first cluster comprises a first acoustic model coupled to all processors of the first cluster.

* * * * *